United States Patent [19]

Schneider et al.

[11] Patent Number: 4,834,793

[45] Date of Patent: * May 30, 1989

[54] OXIDATION PROCESS FOR RELEASING METAL VALUES IN WHICH NITRIC ACID IS REGENERATED IN SITU

[75] Inventors: John C. Schneider, Acton; Gezinus Van Weert, Caledon East; Kenneth J. Fair, Willowdale, all of Canada

[73] Assignee: Hydrochem Developments Ltd., Brampton, Canada

[ * ] Notice: The portion of the term of this patent subsequent to Jun. 2, 2004 has been disclaimed.

[21] Appl. No.: 14,815

[22] Filed: Feb. 13, 1987

Related U.S. Application Data

[63] Continuation-in-part of Ser. No. 713,752, Mar. 19, 1985, Pat. No. 4,670,051.

[51] Int. Cl.$^4$ .............................................. C22B 3/00
[52] U.S. Cl. .................................. 75/101 R; 75/117; 75/118 R; 75/119; 75/120; 75/121
[58] Field of Search ................. 75/101 R, 117, 118 R, 75/119, 120, 121

[56] References Cited

U.S. PATENT DOCUMENTS

| | | | |
|---|---|---|---|
| 3,966,462 | 6/1976 | Posel et al. | 75/101 R |
| 3,992,270 | 11/1976 | Lemarinel et al. | 75/101 R |
| 4,132,758 | 1/1979 | Frankiewicz et al. | 423/109 |
| 4,250,149 | 2/1981 | Welsh | 423/27 |
| 4,670,051 | 6/1987 | Schneider | 75/120 |

Primary Examiner—Melvyn J. Andrews
Attorney, Agent, or Firm—Ridout & Maybee

[57] ABSTRACT

An oxidation process for releasing a metal of interest in an ore is described. The process is especially useful for releasing a metal of interest entrapped in a refractory ore. The process comprises reacting the ore with nitric acid until sufficient oxidation has occurred to release the metal of interest so that it may be recovered by conventional techniques. Nitric acid is regenerated in situ by aerating the liquid medium and contacting it with the off gases generated by the oxidation. The process is continuous and the nitric acid is recycled to the reactor preferably after removal of accumulated sulfate.

22 Claims, 7 Drawing Sheets

OXIDATION PROCESS FOR RELEASING METAL VALUES IN WHICH NITRIC ACID IS REGENERATED IN SITU

This application is a continuation-in-part of application Ser. No. 713,752 filed Mar. 19, 1985.

This invention relates to a method for chemically treating ores so that the metals of interest may be recovered therefrom. The invention particularly relates to a method for treating refractory ores so that a metal of interest may be recovered therefrom. The method may be used to recover such metals of interest as gold, silver, cobalt, nickel, copper, zinc, uranium, tungsten, and molybdenum as well as others.

A refractory ore may generally be defined as an ore which currently could be processed by an oxidative pretreatment such as roasting prior to processing for extraction of the metal of interest. In the gold and silver industry, such gold or silver bearing refractory ores most commonly are the arsenical ores such as arsenopyrite and cobaltite, and ores containing antimony. The arsenopyrite ores usually contain substantial amounts of pyrite and lesser amounts of minerals containing antimony, zinc, copper, selenium, tellurium and other metals. While gold and silver comprise a commercially attractive constituent of these ores, the gold and silver cannot be leached by conventional cyanide processes because they are bound within the structure or inhibited by the chemical makeup of the refractory ore. It has been understood for some time that the key to releasing the gold and silver in these refractory ores is to oxidize the ore, thus modifying its existing structure.

Oxidation of an arsenopyrite or other sulfidic ore may be carried out by roasting the ore in the presence of air or oxygen. Since these ores are sulfidic, a large amount of sulfur dioxide is produced. Volatile arsenic compounds, such as arsenic oxides, are also released upon roasting of an arsenopyrite ore. Thus, the environmental impact from roasting a refractory ore is such that costly systems for dealing with the hazardous by-products must be installed. Also, the presence of antimony in a refractory ore has been noted to have a deleterious effect.

Other methods for oxidatively treating refractory ores involve oxidizing the crushed ore, usually in a slurry, in the presence of oxygen at elevated pressure and temperature. These methods require the use of a pressure autoclave which is a costly apparatus to install and operate. Exotic alloys are required in construction, and silver is not released consistently by these processes. Often, pure oxygen instead of air needs to be utilized in these autoclave processes due to operating considerations.

The present invention overcomes many of the disadvantages of known oxidation processes for refractory ores and other ores by providing a continuous process which may be performed at atmospheric pressure wherein no deleterious gases are released to the atmosphere and the tailings may be disposed of in a safe and economical fashion. Oxidation of ores in accordance with the invention involves the treatment of the crushed ore in a slurry of nitric acid. Sulfide, which in the context of this disclosure and claims includes disulfide and other polysulfide anions, is oxidized by the nitric acid at least to elemental sulfur and including those higher oxidation species up to sulfate. Arsenic, antimony, iron, zinc, copper and other metallic constituents of the ore may be solubilized and oxidized depending on the oxidation conditions.

The process incorporates the in situ regeneration of nitric acid from the nitrogen oxide reaction products of the ore treatment. Thus, the process does not consume uneconomically large quantities of nitric acid, but requires only a steady input of lime ($Ca(OH)_2$) or limestone ($CaCO_3$), principally to precipitate formed sulfate as gypsum. Where calcium carbonate is present in the ore, limestone requirements are reduced.

The process is energy efficient, requiring circulation means for fluids and motors for agitators used therein. Considerable heat is generated at various stages of the process which may be recovered for use in operating the plant. Since the process employs nitric acid, the use of stainless steel is usually suitable for the construction of the equipment needed to carry out the process.

Because the oxidation power of nitric acid is dependent on its concentration and the operating temperature and pressure of the reactor, the emf of the process can be controlled to effect selective oxidation of various species comprising the ore. This control inherent in the process affords it great flexibility, and thus, may be suitably employed in a wide range of ore treatment applications.

The process does not require the installation of expensive equipment or equipment made of exotic alloys. Rather, the process makes use of the superior gas/liquid contacting provided by surface agitation of the aqueous liquid phase in the preferred manner hereinafter described and claimed to obtain a highly efficient regeneration of nitric acid.

Accordngly, the invention provides a process conducted at ambient pressure for oxidizing an ore to enable recovery of at least one metal of interest. A slurry of crushed ore is continuously reacted with nitric acid to oxidize the ore and render the metals of interest susceptible to recovery. Nitrogen oxide gases are generated in this oxidation which are continuously contacted with oxygen to oxidize the NO content of the gas mixture to higher oxides of nitrogen, principally $NO_2$, and here referred to as $N_xO_y$. The $N_xO_y$ is continuously contacted with water to regenerate nitric acid. This regeneration is accomplished in a highly efficient manner preferably at ambient pressure by causing surface agitation of the aqueous liquid phase to provide liquid droplets as a discontinuous phase in the nitrogen oxides containing gas phase. This discontinuous liquid phase provides an extremely high liquid surface area in contact with the overlying gases thereby promoting a rapid and efficient conversion of the gaseous $N_xO_y$ to aqueous nitric acid.

The preferred embodiments hereinafter described relate specifically to the oxidation of a gold and silver containing sulfidic, refractory ore for the purpose of freeing the gold and silver trapped therein so that they may be recovered by conventional chemical leaching techniques. It should be appreciated by those skilled in this art that the process of the invention has wide application to the oxidative processing of ores generally. To this end the various process steps and reagents may be modified to suit the particular application in a manner which should be apparent to the skilled person.

The preferred embodiments will be described with reference to an ore referred to as arsenopyrite. It should be understood that the designation arsenopyrite is not meant in the narrow sense of FeAsS, but rather pertains to a mineral mixture of which FeAsS is a major component. As mentioned above, such arsenopyrite ores may also contain pyrite ($FeS_2$), chalcopyrite ($CuFeS_2$) and sulfides, oxides or salts of any of a wide variety of metals including copper, cobalt, zinc, antimony or bismuth.

A preferred embodiment of the invention will be described with reference to the drawings in which.

In the following description it will be understood that the term "ore" also includes an ore concentrate, e.g. an ore which has been subjected to a mineral beneficiation process.

Figure 1:
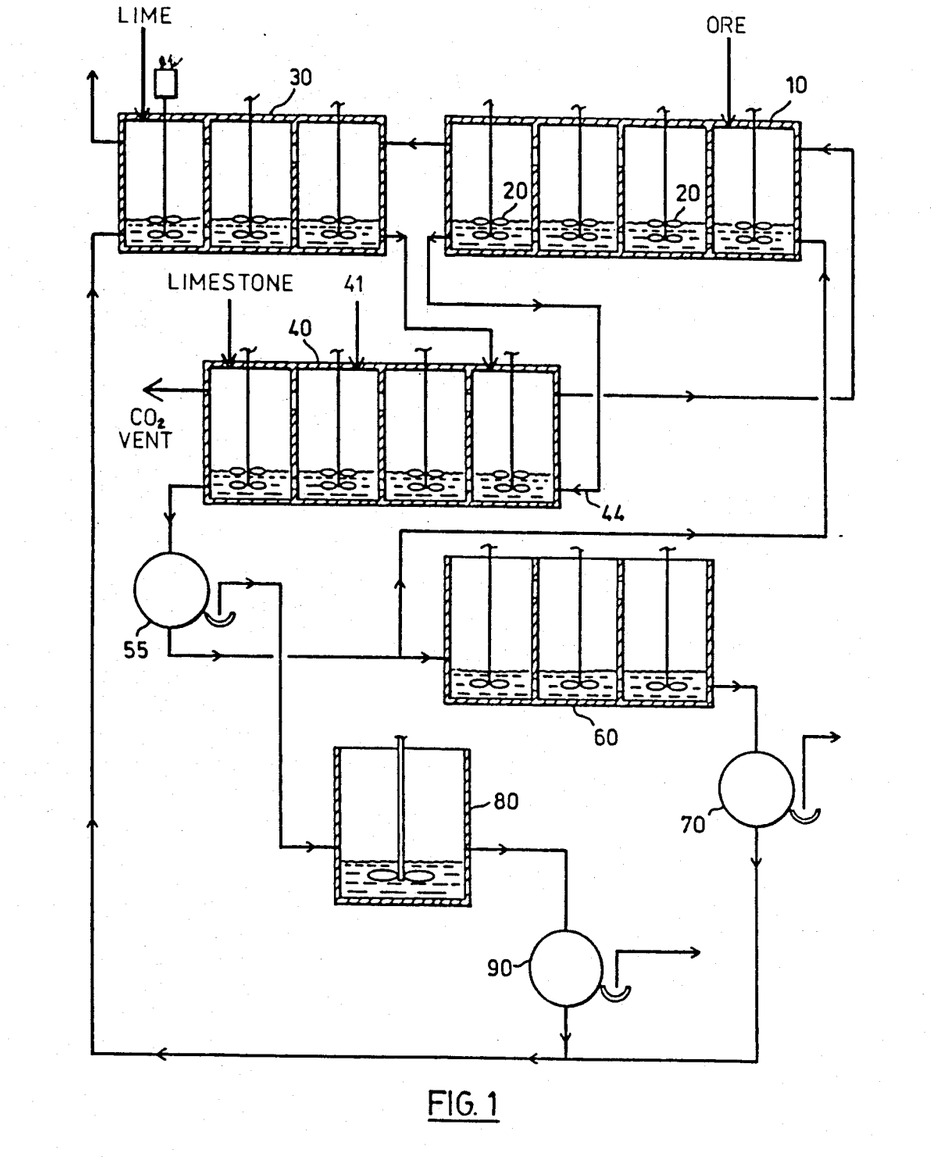
FIG. 1 is a schematic representation of an embodiment of the overall process.

One embodiment of the overall process is schematically shown in FIG. 1. Crushed ore, preferably as a slurry in water, is fed into one end of a continuous reactor 10 which contains aqueous nitric acid. The actual molarity of the nitric acid in the reactor 10 will depend on the process requirements for the particular ore being oxidized, including the water balance parameters for the initial stages. Generally, with an arsenopyrite ore the reactor 10 will be charged with about 1M nitric acid (about 6.5% by weight) and this initial concentration is maintained in the reactor 10 due to the continuous regeneration of nitric acid in accordance with the invention.

There are a number of chemical reactions which operate concurrently in the reactor 10. A sufficient amount of the sulfur component of the arsenopyrite ore, existing initially as sulfide ($S^{-2}$) or polysulfide, is oxidized at least to elemental sulfur to release the metal of interest from the structure of the ore. Under the preferred process conditions of 1M $HNO_3$, this oxidation is accompanied by the reduction of nitrate principally to nitric oxide. The major reactions in this regard pertaining to the oxidation of arsenopyrite and pyrite may be written as follows:

$$3FeAsS + 14HNO_3 + 2H_2O \rightarrow 3FeAsO_4.2H_2O + 3H_2SO_4 + 14NO$$

$$3FeS_2 + 18HNO_3 \rightarrow Fe_2(SO_4)_3 + Fe(NO_3)_3 + 3H_2SO_4 + 15NO + 6H_2O$$

At higher concentrations of nitric acid than those preferred in the present process, the oxidation tends to generate $NO_2$.

It should be emphasized at this point that it may not be necessary to oxidize all of the sulfides present in the refractory ore to effect the release of gold or other metal of interest from the structure of the ore in which it is contained. For example, an ore comprising arsenopyrite and pyrite may release the gold and silver contained therein upon oxidation of the arsenopyrite sulfide portion while leaving the pyrite essentially unoxidized. This selective oxidation can be accomplished by controlling the emf of the oxidation through the nitric acid concentration and the temperature in the reactor 10. The arsenopyrite sulfide is oxidized at a lower emf than is the pyrite sulfide, thus, controlling the oxidation conditions in this manner provides a more efficient process than would be the case if harsher oxidation conditions were used. Clearly, each ore refining situation will have its own peculiar requirements for effecting the most complete recovery of the metals of interest, and it should be understood from the foregoing that oxidation of all sulfidic species comprised within the ore may not be necessary to optimize recovery. The oxidation of the ore is an exothermic process, and it has been found that the heat of reaction can be used to operate the reactor 10 at up to about 105° C., which would be the boiling point of the oxidation liquor at atmospheric pressure. The optimum temperature will vary with the particular requirements of each ore.

Large amounts of nitric acid are consumed in this oxidation process and in order to make the process economically attractive, the nitrogen oxides generated in the oxidation must be reoxidized to nitric acid.

Nitric acid regeneration may be written as follows:

$$3NO + 3/2\ O_2 \longrightarrow 3NO_2 \quad \text{(fast)}$$

$$3NO_2 + H_2O \longrightarrow 2HNO_3 + NO \quad \text{(rate limiting)}$$

$$2NO + 3/2\ O_2 + H_2O \longrightarrow 2HNO_3$$

The regeneration of nitric acid from $NO_2$ and NO requires oxygen and water. The reactor 10 is connected to other vessels used to carry out the process but is closed to the surrounding atmosphere. Air may be circulated preferably cocurrently with the flow of slurry through the reactor 10 at a sufficient rate to provide a constantly renewing supply of oxygen for oxidation of NO to $NO_2$. While pure oxygen may be introduced into the reactor 10 for this purpose, economic considerations make the use of air clearly preferred in most applications. As described in more detail below, the reactor 10 is equipped with surface agitators 20 which throw sprays of aqueous reaction liquid upwardly into the overlying gas phase in the reactor 10, thereby providing a discontinuous liquid phase in the continuous gas phase which allows the regeneration of nitric acid to proceed.

While the nitric acid may be nearly completely regenerated in this fashion within the reactor 10, the gas stream exiting the reactor 10 still contains minor amounts of NO and $NO_2$. To recover these nitrogen oxides, this exiting gas stream is passed through a scrubber 30 where it is subjected to a discontinuous phase preferably of aqueous calcium hydroxide causing the following reaction:

$$4NO_2 + 2H_2O \longrightarrow 2HNO_2 + 2HNO_3$$
$$\Big\downarrow 2Ca(OH)_2$$
$$2H_2O + Ca(NO_2)_2 + Ca(NO_3)_2 \longleftarrow$$

While the regeneration of nitric acid may occur essentially completely within the reactor 10 as described, process conditions including the quantities of ore to be oxidized at a given time may dictate the partial separation of the ore oxidation and nitric acid regeneration steps. Relevant factors in this regard include the reaction kinetics and thermodynamics of the nitric acid regeneration. The oxidation of NO by oxygen is very fast and exothermic, but the reaction of water with $NO_2$ is much slower producing as a byproduct NO, which retards the reaction.

The large amounts of heat generated in the nitric acid regeneration may be utilized in the process by conducting a large portion of the regeneration outside the reactor 10. By limiting the amount of air which enters the reactor 10, the NO generated by the oxidation will drive the oxygen content of the gas exiting the reactor 10 to nil. Water can then be condensed from the exiting gas stream to be used in the process or discarded, and the cooled NO containing gas can then be contacted with air to form $NO_2$. The heat generated by this oxidation may be efficiently utilized in the process. The $NO_2$ gas is then reacted with water at ambient pressure to regenerate nitric acid.

The slurry exiting the reactor 10 contains silver and gold which have been released from the crystal structure of the feed ore. The released silver and gold can be recovered by conventional chemical leaching techniques. Additionally, those metal ions now in solution may be recovered by selective precipitation or other conventional processes.

At this point in the process there are a number of options available for manipulating the solid and liquid components comprising the slurry exiting from the reactor 10. The solid may be simply filtered and subjected to a conventional leaching process to recover the gold and silver now released from the refractory ore. However, to reduce the number of filtering steps in the process, it is preferred to filter the slurry after it has been subjected to sulfate precipitation as described below. The liquid component of the slurry contains nitric acid which should be recycled to the reactor 10, and it also contains sulfuric acid which must be removed before it reaches a concentration within the reactor 10 which would have a deleterious effect on the process chemistry or the process apparatus. The sulfuric acid can be removed as calcium sulfate or other insoluble compounds, and the nitric acid can be recovered for reuse in the reactor by introducing the oxidized ore slurry into a precipitator vessel 40 where it is contacted preferably with calcium ion from lime ($Ca(OH)_2$), which may be derived from the liquid stream exiting the scrubber 30. This latter stream contains $Ca(NO_2)_2$ and $Ca(NO_3)_2$ as well as $Ca(OH)_2$ all in solution. The combination of the two streams in the vessel 40 causes the removal of calcium and sulfate ions as gypsum, $CaSO_4.2H_2O$, and the nitrite and nitrate ions are freed to reenter the nitric acid cycle. Conditions within the precipitator 40 must be maintained at low pH, i.e. 1–2, so that the iron is coprecipitated with the gypsum, without precipitation of other valuable metal ions. Of course, the stream exiting the scrubber 30 can be contacted with air prior to its introduction into the precipitator 40. This contacting would serve to oxidize most of the nitrite to nitrate thereby increasing the oxidative potential of the stream which enters the precipitator 40, and hence, reducing the oxygen requirement from the air intake 41. This alternative arrangement may have advantages in certain applications especially where it is desired to restrict the flow of air through the reactor 10.

Additional calcium ion as limestone is added to the process as needed at the precipitator 40. Some refractory ores contain significant amounts of $CaCO_3$ which will reduce the limestone requirement for the precipitator 40. If the ore contains so much $CaCO_3$ that it will require an uneconomical amount of acid to neutralize it, it may be separated from the raw ore by an initial flotation concentration step and then used in the process for the precipitation of gypsum.

The air intake 41 for the process as shown in FIG. 1 is located in the precipitator 40 remote from the liquid intake 44. Air flows from the precipitator 40 to the intake of the reactor 10 carrying with it any nitrogen oxides not recaptured as nitrous or nitric acid in the precipitator 40. Thus, the air flow for the system in this embodiment of the invention runs through the precipitator 40, the reactor 10, the scrubber 30 and back to the atmosphere. The reactor 10, scrubber 30 and precipitator 40 are all covered or closed vessels so that nitrogen oxides cannot escape the system. However, it should be understood that these covered vessels are not normally pressurized, but operate under the ambient pressures associated with the gas circulation therethrough and the heat of the reactions associated therewith. Because the natures of ores vary widely, it may be deemed desirable in certain situations to use pressurized vessels in the process of the invention. However, it is normally thought to be an advantage of the present invention that the process can be carried out at ambient pressure.

At this stage of the process, the acidic slurry containing precipitated gypsum and iron as well as the oxidized ore, can be removed from the precipitator 40 and the acidic liquid separated from the solids at a filter 55. The liquid filtrate is recycled to the intake of the reactor 10 at which point additional nitrate may be added as required.

It may be desirable to recover metallic cations solubilized by the oxidation process. Such metals of interest may include zinc, cobalt, nickel or even copper. In order to recover these cations, a portion of the liquid exiting the filter 55 is diverted to a second precipitator 60. The precipitator 60 comprises a series of stages wherein the pH of the filtrate is raised preferably by the addition of lime ($Ca(OH)_2$). The rising pH in the precipitator 60 causes the selective precipitation of various metallic cations generally as the hydroxides and oxides thereof. The recovery of those compounds of interest from the precipitator 60 is accomplished at a filter 70 and the filtrate is used to charge the scrubber 30, or the filtrate can be subjected to further pH adjustment in a second or more such precipitators 60 and filters 70 until the pH is maximized by the lime.

Preparatory to a conventional cyanide leach process, the filtered solids from the gypsum precipitator 40 may be resuspended as a slurry in water, and alkali can be added in a mixing vessel 80 to adjust the pH. The slurry can be passed through a filter 90 and the solids then subjected to a conventional cyanide process for extracting the gold and silver therefrom.

The filtrate from the filter 90 is combined with the filtrate from the filter 70 for use in the scrubber 30. Thus, it can be seen that lime, $Ca(OH)_2$, is consumed and gypsum, $CaSO_4.2H_2O$, is produced in the process. Nitric acid is lost only gradually so that the cost of adding make-up nitrate to maintain the continuity of the process is minimized. Such nitrate need not be supplied as nitric acid. Cheaper sources, such as natural sodium nitrate can be used, since the process produces excess acid from the sulphide portion of the ore.

While a general understanding of the process of the invention may be had from the foregoing description, details of the preferred apparatus will now be described with reference to FIGS. 2–6.

Figure 2:
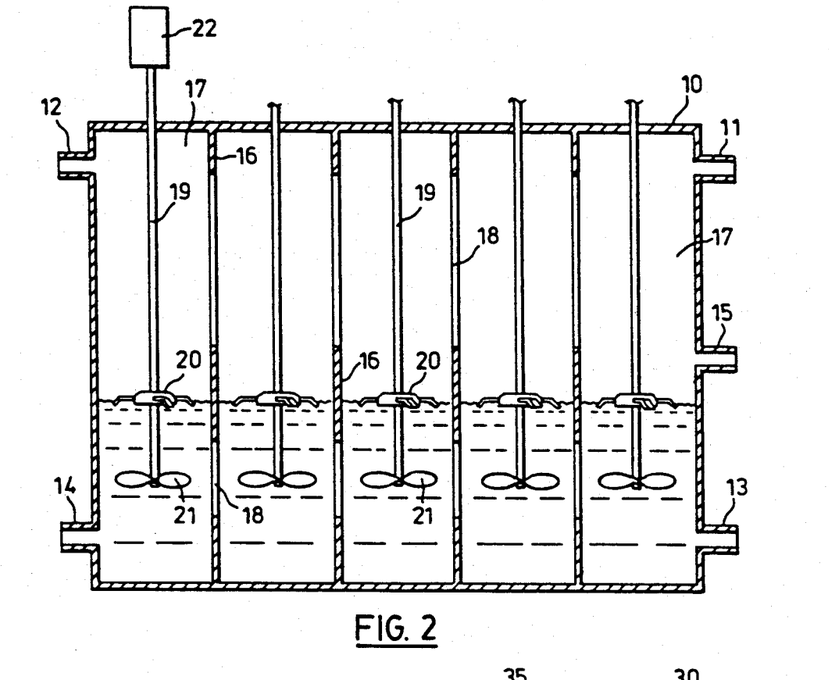
FIGS. 2 through 6 are schematic representations showing some structural details of the preferred apparatus employed in the overall process shown in FIG. 1.

Referring to FIG. 2, the reactor 10 comprises a closed vessel having an inlet 11 and outlet 12 for the gas phase and an inlet 13 for the nitric acid containing solution and an outlet 14 for the oxidized ore slurry. Untreated ore or concentrate in dry or slurried form is introduced into the intake end of the reactor 10 at an inlet 15. The reactor 10 is divided by partitions 16 into a plurality of cells 17 which communicate with adjacent cells 17 via apertures 18 therein. The apertures 18 are located in both the liquid and gas containing portions of the reactor 10 and are sized and positioned so as to promote the desired path and rate of flow for the fluids therethrough. Each partition 16 may have one or several apertures 18 governing the flow of each phase. Normally the apertures 18 comprise slots positioned centrally in the partition 16 and do not usually extend across the full width of the partition 16. Equivalently, the cells 17 may consist of a plurality of free standing vessels connected to each other in a manner similar to that described for the reactor 10.

Each cell 17 is provided with a means for agitating the slurry contained therein. Each such agitator preferably comprises a shaft 19 having a liquid surface impeller 20 and a subsurface impeller 21. Each shaft 19 passes through a sealed opening in the top of each cell 17 and is connected to a motor 22.

The optimum liquid level in the reactor 10 will depend on a number of factors including the reactivity of the ore with nitric acid. Generally, the reactor 10 will have a liquid level between $\frac{1}{4}$ and $\frac{1}{2}$ the height thereof. Generally, the flow of slurry through the reactor 10 is relatively slow, being on the order of one to 24 hours for 5 to 7 cells, while the gas flow through the reactor 10 is much faster, being generally on the order of 3 to 5 minutes. These relative flow rates through the reactor 10 stem from the initial high rate of nitric acid consumption and concurrent evolution of nitrogen oxide gases.

The NO produced in the oxidation of the ore reacts with any oxygen in the reactor 10 to give $NO_2$. A steady contacting of the $NO_2$ with water is required to regenerate $HNO_3$. This latter step is accomplished in each cell 17 of the reactor 10 by means of the surface impeller 20. The impeller 20 is preferably of the type commercially available from Prochem Limited of Brampton, Ontario and comprises an impeller having cambered hydrofoil blades 22 for minimum energy loss due to drag and maximum lift, thrust and pumping action for the liquid phase. The pitch and number of blades 22 determines the surface agitation characteristics most suitable for the present application. The impeller 20 provides superior gas-liquid contacting within each cell 17 by causing the insertion of liquid droplets as a discontinuous phase in the continuous gas phase. The recycle of nitric acid is much more efficiently accomplished using this agitation format than would be the case if the $NO_2$ containing gas were bubbled through the aqueous phase.

Figure 3:
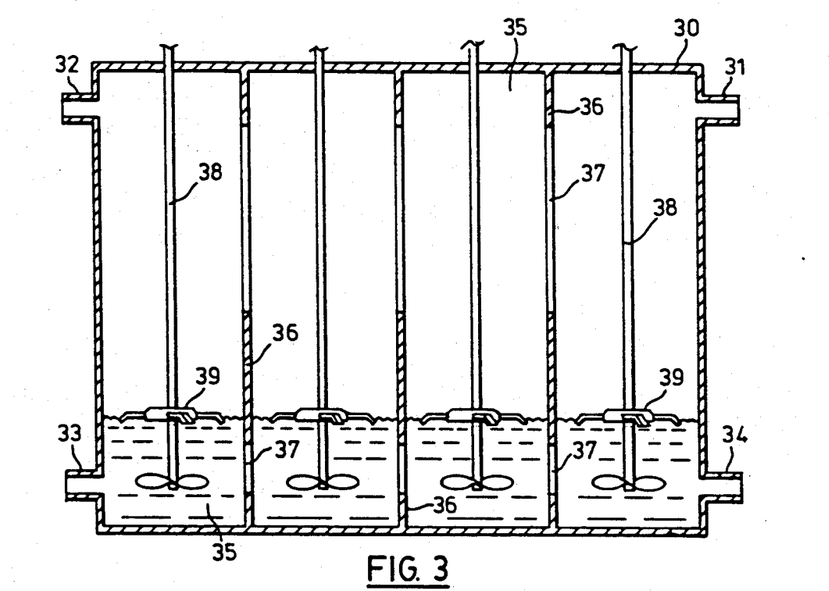

While regeneration of nitric acid from NO and $NO_2$ within the reactor 10 can be greater than 98% efficient for a process having a cocurrent flow of gas and slurry phases through it, the gas exiting the reactor 10 at the outlet 12 may contain environmentally unacceptable levels of $NO_2$ and NO. Under these circumstances, the gas is passed through a scrubber 30 prior to being discharged to the atmosphere. As shown in FIG. 3, the scrubber 30 is a closed vessel having a gas inlet 31 and outlet 32 as well as a liquid inlet 33 and outlet 34 at opposite ends thereof. In the preferred embodiment described herein, the liquid and gas flows in the scrubber 30 are countercurrent to one another, but other process designs may differ in this respect. The scrubber 30 is divided into a plurality of cells 35 by partitions 36 having apertures 37 therein to allow the gas and liquid to flow therethrough in the desired fashion. Each cell 35 is provided with a sealed surface agitator 38 each having an impeller 39 as described previously.

As discussed above, the scrubber 30 is provided with an inflowing stream of aqueous lime ($Ca(OH)_2$) at a pH of about 11. Contacting this lime solution with the $NO_2$ containing gas flowing through the cells 35 of the scrubber 30 efficiently removes the $NO_2$ as calcium nitrite and calcium nitrate in solution.

Figure 4:
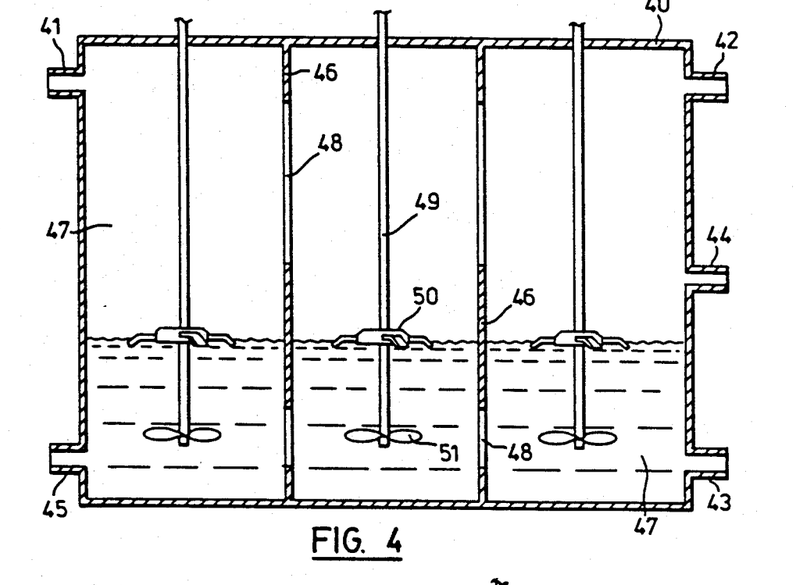
Figure 5:
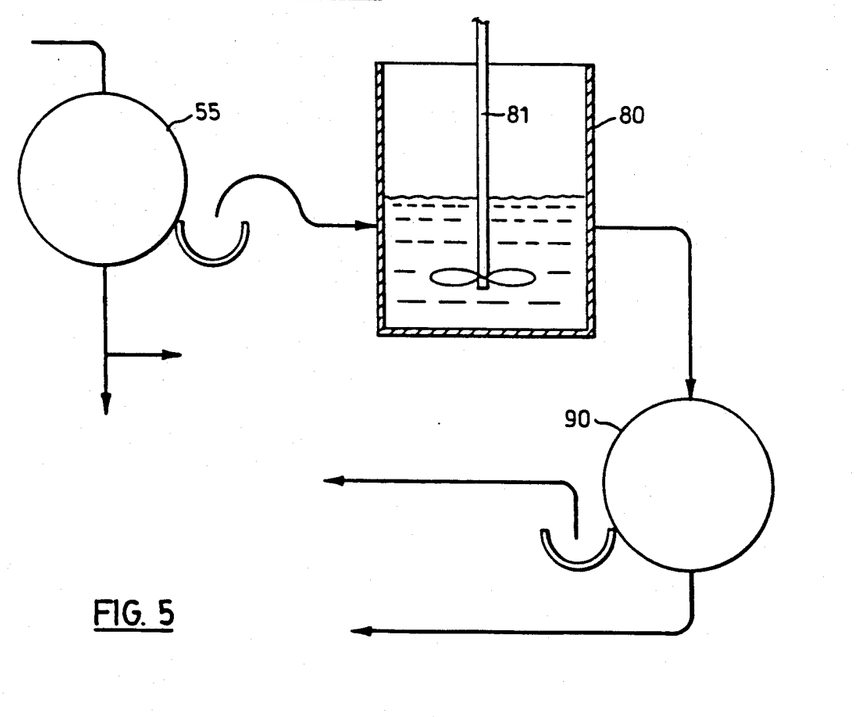

The basic liquid flow from the outlet 34 of the scrubber 30 is mixed with the acidic slurry discharged from the reactor 10 in the precipitator 40 (FIG. 4). The precipitator 40 comprises a closed vessel like the reactor 10 having an inlet 41 and outlet 42 for gas circulating therethrough, and inlets 43 and 44 for the liquid and slurry flows from the scrubber 30 and reactor 10 as well as an outlet 45 for the slurry exiting the precipitator 40.

As shown in FIG. 1, an inlet for the neutralizing agent may also be provided for the precipitator 40 when calcium carbonate is used as the neutralizing agent in the precipitator 40, $CO_2$ gas will be evolved which requires separate venting so as not to dilute the air used for NO oxidation.

As mentioned above, for the described process arrangement, the precipitator 40 provides the air intake 41 for the system, the air flow passing from the outlet 42 to the inlet 11 of the reactor 10. The precipitator 40 is also an important component in the overall scheme of nitric acid regeneration for the process. Here, the unwanted calcium and sulfate ions are removed from the system as gypsum precipitate ($CaSO_4.2H_2O$). By maintaining acidic conditions, preferably between pH 1-2 in the precipitator 40, nitrite and nitrate are released as nitrous and nitric acid. By aerating the liquid in the precipitator 40 by means of the surface impellers 50, the nitric acid cycle is promoted, that is, nitrous acid is oxidized to nitric acid.

The slurry exiting the precipitator 40 can contain particles of sulfur, gypsum, precious metals such as gold and silver, and gangue, and the liquid portion comprises aqueous nitric and sulfuric acid having various metallic cations dissolved therein. This slurry is conveyed to a conventional continuous filter 55 (FIG. 5) from which the filtrate is introduced into the reactor 10 at the liquid inlet 13, and the solid filter cake is transferred to a mixing vessel 80 equipped with an agitator 81 where it is suspended in water and lime is added to adjust the pH to about 11 in preparation for conventional cyanide leaching. It has been found that the temperature used to condition the slurry in the mixing vessel 80 sometimes has an affect on the recovery of gold and silver in the subsequent leaching step. Thus, the temperature in the mixing vessel 80 may be maintained between ambient and 100° C. A second filtration step at the filter 90 removes the lime solution for use in the scrubber 30, and the filtered solids can then be introduced to a conventional cyanide leach circuit for removal of the gold and silver therefrom.

Figure 6:
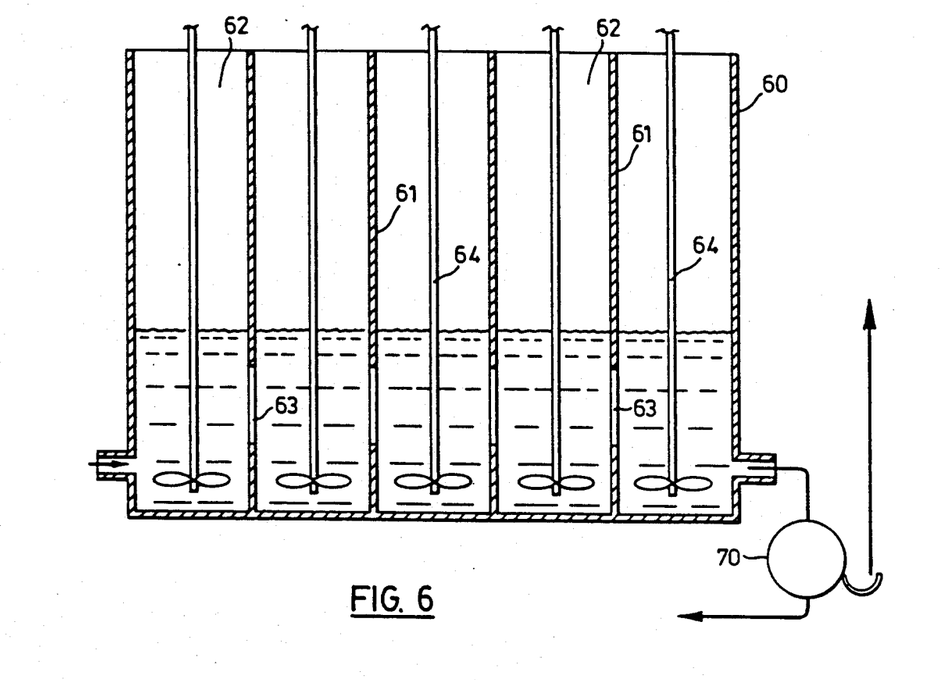

As explained above, metallic cations may be recovered from the filtrate exiting the filter 55 by selective precipitation. Thus, a portion of the liquid stream from the filter 55 can be diverted to a second precipitator 60 (FIG. 6). The precipitator 60 comprises a vessel, which may be open, having a plurality of partitions 61 defining cells 62 therein. Apertures 63 are provided in the partitions 61 to allow the liquid to flow from cell to cell. Agitators 64 are provided in each cell 62 to give thorough mixing to the liquid or slurry contained therein. Lime can be continuously added to each cell 62 as the liquid moves through the precipitator 60 or it can be added into the first cell 62 to raise the pH of the liquid to the desired value. As the pH increases in the liquid, cationic species will selectively precipitate out generally as the hydroxide or oxide. The precipitates of interest may be selectively removed at the filter 70, and the filtrate can be subject to further pH adjustment in additional precipitators 60 to recover other metal values of interest. Ultimately, the filtate from a filter 70 is added to the liquid flow through the scrubber 30. In a further improvement, the $CO_2$ flow from precipitator 40 can be used to force the precipitation of metal carbonates, rather than hydroxides allowing better metal ion separation and precipitate filterability.

The foregoing description relates to a preferred embodiment which enables the operator to choose among a number of options for processing the particular ore in question. It will be apparent to the skilled person that the described process and apparatus can be simplified where the availability of the various options afforded thereby are of no particular interest.

Figure 7:
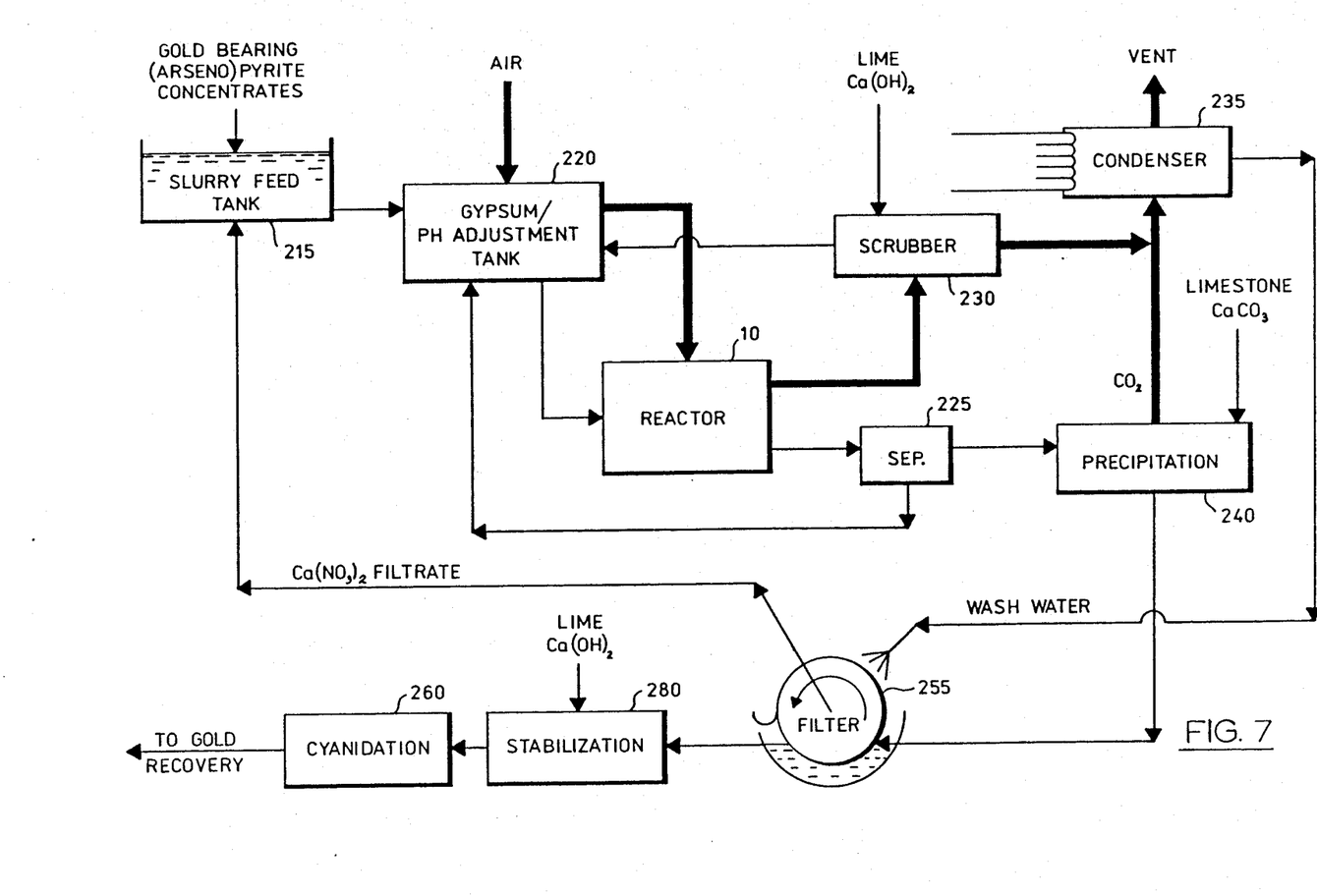
FIG. 7 is a schematic representation of another embodiment of the process of the invention.

For example, FIG. 7 shows a schematic representation of a process in accordance with the present invention which may be used when it is only desired to recover gold and silver from a refractory ore. In FIG. 7, the heavy arrows indicate the flow of gases and the light arrows the flow of liquids or slurries through the system.

A gold bearing ore or concentrate is mixed with calcium nitrate filtrate from a continuous filter 255 in a slurry feed tank 215. This is primarily to facilitate feeding the solids into the closed system as a slurry comprising about 40–50 wt. % solids. The calcium nitrate filtrate has a pH of about 5, and this must be reduced to below pH 1 for the oxidation of the concentrate to proceed.

The slurry is transferred to a pH adjustment tank 220 which is closed to the atmosphere. The pH is lowered by introducing about two thirds of the stream exiting the reactor 10 which comprises about 1M $HNO_3$ and a variable concentration of $H_2SO_4$. The slurry stream exiting the reactor 10 is subjected to a partial separation of the solids from the liquid at a separator 255. The separator 225 may be a hydrocyclone. The stream flowing to the pH adjustment tank 220 from the separator 255 contains a portion of the fine particles comprising the slurry. Oxidation of the concentrate commences in the tank 220, and the presence of calcium ions causes precipitation of some gypsum. Solids recirculation from the reactor 10 provide seed particles for gypsum precipitation, thereby minimizing gypsum deposition on the walls of system components. While oxidation of the concentrate begins under these gypsum precipitation conditions, the rate of oxidation can be controlled by adjusting the temperature of the slurry. The easiest way to control slurry temperature is by controlling the air volume and hence the oxygen concentration, flowing through the pH adjustment tank 220.

The slurry passes from the tank 220 of the multistage reactor 10, previously described, where the temperature is allowed to increase to achieve a thermal balance between heat generation from sulfide and NO oxidation, and heat removal by water evaporation. At ambient pressure, the theoretical boiling point of the solution is about 105° C. This theoretical maximum is lowered in practice by the air flow through the reactor 10 which lowers the vapor pressure of the water in the reactor 10. As a result, the thermal balance for the reactor 10 at ambient pressure is generally about 85° C. At this temperature, oxidation of arsenopyrite can be completed in minutes, and while pyrite reacts slower, it will also be completely oxidized.

Looking at the gas stream through the reactor 10, the bulk of the nitric acid consumed in the oxidation is regenerated within the reactor 10. The off-gas leaving the reactor 10 comprises up to about 5% $N_xO_y$ and up to about 15% $O_2$ on a dry basis. This off-gas is scrubbed with limestone and lime in a scrubber 230 before passing to vent or to a condenser 235 to recover water, which may be used as wash water and lime slurry make-up. The scrubber solution contains both calcium nitrate and nitrite, and it can be returned to the reactor 10 or to the tank 220.

The oxidized solids from the reactor 10 are fed primarily through the separator 225 to a precipitator 240, and a portion of the fines being recycled to the tank 220 as mentioned above. Limestone is preferably added to the precipitator 240 to maintain a pH of about 5. Carbon dioxide is evolved which strips the slurry of an $N_xO_y$ dissolved gases, thereby allowing an open atmospheric filtration of the precipitate at the filter 255. The filtrate is returned to the slurry feed tank 215, thereby closing the liquor circuit.

The washed solids are discharged from the filter 255 to a stabilization tank 280 and then to conventional cyanidation 260 for gold and silver recovery.

The basic process described above is particularly suitable for oxidizing modest quantities of ore or concentrate. A plant handling on the order of 10 tons of concentrate a day produces gas volumes which can still be accommodated within a reactor 10 of a manageable size. However, oxidizing concentrate on the scale of 100 or 1000 tons der day results in the generation of such gas volumes that it is only practical to handle them by a separation of the bulk of the nitric acid regeneration from the ore oxidation reactions in the reactor 10.

The limitations of the ore oxidation and nitric acid regeneration all being contained in the reactor 10 become more apparent from considering the kinetics of the various reactions taking place. The oxidation of pyrite and arsenopyrite is much faster at 85° C.–105° C. than at 25°–45° C., the arsenopyrite being totally consumed in just a few minutes with pyrite oxidation proceeding somewhat slower. On the other hand oxidation of NO proceeds instantaneously at 25° C. but slows significantly at 85° C. The liberation of heat in both of these reactions must be balanced by the evaporation of water so that at the operating temperature of 85° C.–105° C., the gas phase contains about 50% water vapor. This dilution of the NO concentration in the gas phase by water vapor also causes a reduction in the rate of the NO oxidation, but because the reaction is second order, a ½ reduction in the NO concentration results in a ¼ reduction in the rate of its oxidation.

These factors are still not very worrying when scaling up the process were it not for the fact that the reaction of $NO_2$ with water to form nitric acid is the rate limiting step for the overall acid regeneration cycle. A residence time of about 3 minutes is required for the NO gas generated in the reactor 10 to be converted back into nitric acid. This is no problem on a relatively small scale where a gas flow through the reactor 10 may be on the order of 5 minutes, but this residence time becomes unmanageable upon the generation of the large gas volumes dictated in a relatively large scale process.

Figure 8:
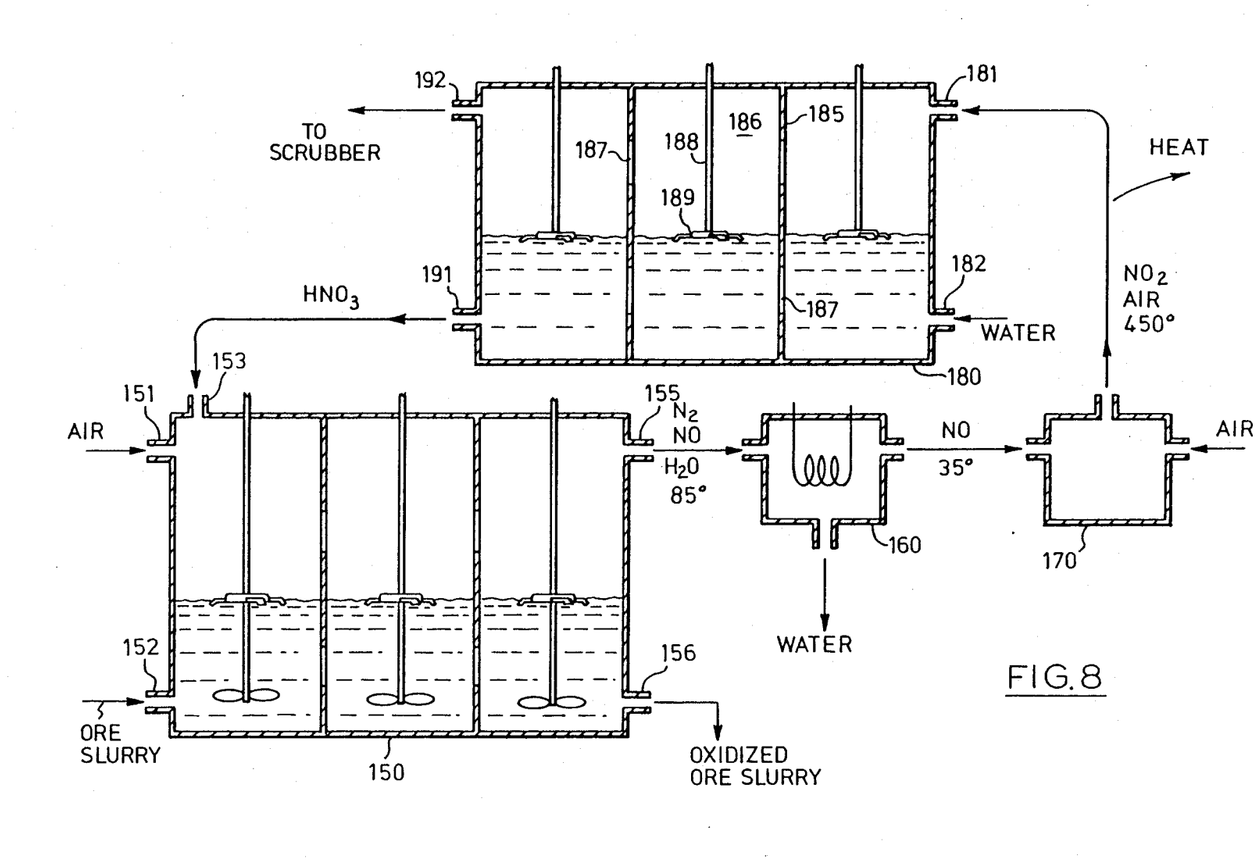
FIG. 8 is a schematic representation of the oxidation process of the invention as applied to the treatment of large quantities of ore.

The solution to the problem of processing large quantities of ore is illustrated in the flow diagram of FIG. 8. A reactor 150 has a structure as previously described. Inlets 151 and 152 are provided at one end of the reactor 150 for air and ore slurry, and an inlet 153 is provided for aqueous nitric acid. Outlets 155 and 156 are located at the other end of the reactor 150 for the gas phase and the oxidized ore slurry.

The oxidation of sulfidic species within the reactor 150 generates a lage volume of NO under the preferred conditions (see examples below), and the exothermic oxidation of the ore raises the temperature within the reactor 150 to about 85° C.–105° C. The quantity of air or oxygen which is allowed into the reactor 150 is restricted to that amount which may be efficiently utilized for nitric acid regeneration within the reactor 150. As mentioned, when processing large quantities of ore or concentrate, the size of the reactor 150 cannot economically be made sufficiently large to allow for the necessary residence time to convert all of the nitrogen oxide gases generated by the ore oxidation back into nitric acid. Thus, while it is possible to exclude air entirely from the reactor 150, the reactor design requires a substantial volume of freeboard above the liquid level passing through it, and therefore, this space should be utilized to convert at least some of the NO generated to nitric acid. By restricting the oxygen intake to the reactor 150, the excess of NO will reduce the oxygen concentration essentially to zero in the gas phase exiting the reactor 150.

The gases exiting the reactor 150 through the outlet contain roughly equal quantities of NO and water vapor at about 85° C.–105° C. This gas stream is passed through a condenser 160 where the water is removed for use in the process or to the waste stream, and the cooled (35° C.) gas, now having an NO concentration twice that of the feed stream for the condenser 160, is fed into an oxidizer 170 where it is reacted with an excess of oxygen, provide preferably from an air stream, to give $NO_2$ and heat.

The flow of gases through the oxidizer is very fast since, as mentioned, the reaction between NO and $O_2$ is very rapid at about 35° C. but slows as the temperature is increased. The large amounts of heat produced by the NO oxidation may raise the temperature of the gas stream exiting the oxidizer 170 to approximately 450° C. This heat may be utilized elsewhere in the process, and the cooled gas stream containing a high concentration of $NO_2$ is then fed into a staged contactor 180 where the $NO_2$ is reacted with water in process solutions to generate nitric acid. The staged contactor 180 has inlets 181 and 182 for the gas and water streams. The contactor 180 is provided with several partitions 185 which define cells 186. Each partition 185 has apertures 187 to allow the flow of the liquid and gas phases through the contactor 180 from cell to cell. The preferred basic structure of the contactor 180 is much like that of the reactor 150. Surface agitation means are provided in each cell 186 to create a discontinuous liquid phase in the gas phase contained in each cell 186. The agitation means comprise a sealed shaft 188 and surface impeller 189 as previously described.

Sufficient residence time is provided for the $NO_2$ gas in the contactor 180 to achieve virtually complete conversion to nitric acid, e.g. over 98%. The nitric acid formed in the contactor 180 is removed via an outlet 191 for recycling to the reactor 150. The gas stream exits the contactor 180 through an outlet 192 to a scrubber for removal of any residual nitrogen oxides as previously described.

From the foregoing description, the skilled person will appreciate the advantages provided by the present invention which enables the processing of large quantities of ore and the in situ regeneration of nitric acid consumed in the ore oxidation at ambient pressure using low capital cost equipment. The arrangement of FIG. 8 allows for the efficient utilization of heat generated in the process and the recycling of water. Waste streams are environmentally safe.

A greater appreciation of the present invention may be obtained by reference to the following examples.

EXAMPLES

The concentrates and ores shown in Tables 1 and 2 were subjected to oxidation in accordance with the process of the invention by flowing each sample through a multistage reactor as a slurry in approximately 1M aqueous $HNO_3$. For experimental simplicity the reaction was monitored by following the emf, and nitric acid was regenerated within the reactor as previously described. The recoveries of gold and silver from the treated samples are shown in Tables 1 and 2.

TABLE 1

| | Gold Recoveries From Concentrates | | | |
|---|---|---|---|---|
| | HEAD ASSAY | | Au EXTRACTION % | |
| | Au (g/ton) | As % | S % | Untreated | Oxidized |
| A | 20.5 | 3.68 | 4.2 | 33 | 93 |
| B | 87.1 | 18.5 | 29.0 | 10 | 90 |
| C | 29.9 | 9.4 | 32.0 | 0 | 95 |
| D | 33.3 | 7.5 | 18.2 | 72 | 98 |
| E | 7.5 | 1.5 | 0.9 | 0 | 70 |
| F | 16.0 | 0.05 | 4.5 | 50 | 96 |
| G | 8.1 | 0.1 | 2.7 | 40 | 95 |
| H | 41.1 | 8.9 | 26.3 | 17 | 97 |
| I | 3.4 | 3.2 | 3.9 | 15 | 89 |

TABLE 2

| | Silver Recoveries | | | |
|---|---|---|---|---|
| | | | % Ag EXTRACTION | |
| | SAMPLE | Ag (g/ton) | Untreated | Oxidized |
| J | ore | 718 | 36 | 90 |
| K | conc. | 1096 | 23 | 95 |

While the foregoing description has related to a continuous process wherein the various gas and liquid streams are described as flowing in a particular fashion relative to one another, it should be appreciated that the invention is of a more general scope. Thus, the gas and liquid flows in the reaction vessel 10 may be countercurrent to one another, and this may be preferred in certain applications. Also, the invention includes the oxidation step or any of the other described process steps when carried out in a batch-wise fashion. These and other variations of the process of the invention which would be apparent to one skilled in this art are meant to be included in the scope of the invention as defined in the following claims.

We claim:

1. A process conducted at ambient pressure for oxidizing an ore to enable recovery of at least one metal of interest, comprising:

continuously reacting the crushed ore in an aqueous slurry with nitric acid, thereby oxidizing the ore to render the metals of interest susceptible to recovery and generating nitrogen oxide gases comprising NO, the slurry being continuously agitated by at least one agitation means to maintain the crushed ore in suspension;

continuously contacting the nitrogen oxide gases with oxygen to oxidize the NO contained in the gases to $NO_2$; and continuously contacting the $NO_2$ containing gases with water for a sufficient time to regenerate a major portion of the nitric acid consumed in the oxidation of the ore, the water being provided as a discontinuous liquid phase in the $NO_2$ containing gas phase by means of at least one agitator, comprising a first impeller mounted on a rotatable shaft, providing sufficient agitation at the liquid surface.

2. A process as claimed in claim 1, wherein the ore is refractory.

3. A process as claimed in claim 1, wherein oxygen is supplied as air.

4. A process as claimed in claim 1, wherein the agitation means for the slurry comprises a second impeller mounted on a rotatable shaft to provide sufficient agitation below the surface of the liquid.

5. A process as claimed in claim 1, further comprising, separating the oxidized ore from the slurry liquid and recycling the liquid for use in the oxidation of the ore.

6. A process as claimed in claim 1, wherein the ore is sulfidic and further comprising, treating the slurry of oxidized ore to remove a substantial portion of soluble sulfate contained therein, separating the oxidized ore from the slurry liquid, and recycling the liquid for use in the oxidation of the ore.

7. A process as claimed in claim 6, wherein the sulfate is removed by precipitation.

8. A process as claimed in claim 1, wherein the oxidation of the ore is conducted at a temperature from ambient to about the boiling point of the slurry liquid.

9. A process as claimed in claim 1, wherein the oxidation of the ore is conducted from about 80° C. to 105° C.

10. A process as claimed in claim 1, wherein approximately 1M nitric acid is used to oxidize the ore.

11. A process as claimed in claim 1, wherein the metal of interest is one or more of the following: gold, silver, cobalt, nickel, copper, zinc, uranium, tungsten or molybdenum.

12. A continuous process conducted at ambient pressure for oxidizing a sulfidic ore to enable recovery of at least one metal of interest, comprising:

slurrying the crushed ore in an aqueous solution containing calcium ions;

adjusting the pH of the slurry using aqueous process liquid containing nitric and sulfuric acids, thereby causing the precipitation of soluble sulfate as gypsum;

oxidizing the slurry of crushed ore with nitric acid, thereby rendering the metals of interest susceptible to recovery and generating nitrogen oxide gases comprising NO;

contacting the gaseous nitrogen oxides with oxygen to oxidize the NO contained therein to $NO_2$; and contacting the $NO_2$ containing gases with water for a sufficient time to regenerate a major portion of the nitric acid consumed in the oxidation of the ore, the water being provided as a discontinuous liquid phase in the $NO_2$ containing gas phase by means of at least one agitator, comprising an impeller mounted on a rotatable shaft, providing sufficient agitation at the liquid surface.

13. A process as claimed in claim 12, wherein the slurried ore is oxidized in a first stage and a major portion of the NO is oxidized in a second stage.

14. A process as claimed in claim 13, wherein water is condensed from the nitrogen oxides containing gas prior to the second stage.

15. A process as claimed in claim 12, wherein the oxidized ore is partially separated from the slurry liquid so that the major portion of coarse particles is contained in a first slurry stream and a portion of the fine particles is contained in a second slurry stream, the second stream being utilized to adjust the pH of the unoxidized ore slurry.

16. A process as claimed in claim 15, wherein the partial separation is achieved by means of a hydrocyclone.

17. A process as claimed in claim 15, wherein the first slurry stream is treated with aqueous calcium ions to cause the removal of dissolved sulfate by the precipitation of gypsum, and the gypsum containing stream is then filtered.

18. A process as claimed in claim 17, wherein the calcium ions are provided to the first slurry stream by the addition of limestone to it.

19. A process as claimed in claim 12, wherein the oxidiation of the ore is conducted from about 80° C. to about 105° C.

20. A process as claimed in claim 12, wherein approximately 1M nitric acid is used to oxidize the ore.

21. A process as claimed in claim 12, wherein the metal of interest is one or more of the following: gold, silver, cobalt, nickel, copper, zinc, uranium, tungsten or molybdenum.

22. A process as claimed in claim 13, wherein less than about 10% of the NO generated in the first stage is oxidized therein, the remaining NO being reacted with an excess of oxygen in the second stage, thereby converting almost all of the NO to $NO_2$.

* * * * *